(12) United States Patent
Seo

(10) Patent No.: US 7,992,009 B2
(45) Date of Patent: Aug. 2, 2011

(54) DEVICE AND METHOD CAPABLE OF VERIFYING PROGRAM OPERATION OF NON-VOLATILE MEMORY AND METHOD CARD INCLUDING THE SAME

(75) Inventor: Kyung-Duck Seo, Yongin-si (KR)

(73) Assignee: Samsung Electronics Co., Ltd., Suwon-si. Gyeonggi-do (KR)

( * ) Notice: Subject to any disclaimer, the term of this patent is extended or adjusted under 35 U.S.C. 154(b) by 1222 days.

(21) Appl. No.: 11/650,124

(22) Filed: Jan. 5, 2007

(65) Prior Publication Data
US 2007/0168793 A1 Jul. 19, 2007

(30) Foreign Application Priority Data

Jan. 9, 2006 (KR) .................. 10-2006-0002290

(51) Int. Cl.
*G06F 12/14* (2006.01)
*G06F 3/00* (2006.01)
*G06F 12/00* (2006.01)

(52) U.S. Cl. ........ 713/187; 713/159; 713/161; 713/165; 713/182; 713/185; 713/193; 713/194; 726/2; 726/4; 726/9; 726/20; 726/22; 726/26; 726/30; 726/34; 710/52; 710/54; 710/55; 710/56; 711/100; 711/206; 711/207; 711/208; 711/209; 714/48; 714/49; 714/52; 714/748

(58) Field of Classification Search .................. 713/187, 713/165, 193; 726/26, 30; 710/52, 55; 711/100
See application file for complete search history.

(56) References Cited

U.S. PATENT DOCUMENTS

| 4,607,290 | A | * | 8/1986 | Murakami | ..................... | 358/410 |
|---|---|---|---|---|---|---|
| 5,410,546 | A | * | 4/1995 | Boyer et al. | ................... | 714/763 |
| 5,541,886 | A | * | 7/1996 | Hasbun | ..................... | 365/185.03 |
| 5,563,828 | A | * | 10/1996 | Hasbun et al. | ............ | 365/185.33 |
| 5,602,995 | A | * | 2/1997 | Hendel et al. | ................. | 711/209 |
| 6,092,229 | A | * | 7/2000 | Boyle et al. | ..................... | 714/748 |
| 6,266,273 | B1 | * | 7/2001 | Conley et al. | ............ | 365/185.11 |
| 7,107,389 | B2 | * | 9/2006 | Inagaki et al. | ................ | 711/103 |
| 7,296,128 | B2 | * | 11/2007 | Lee | ............................. | 711/165 |

(Continued)

FOREIGN PATENT DOCUMENTS

JP 2003085511 3/2003

(Continued)

OTHER PUBLICATIONS

English Abstract for Publication No. 1020000060928.

(Continued)

*Primary Examiner* — Edan Orgad
*Assistant Examiner* — Jenise E Jackson
(74) *Attorney, Agent, or Firm* — F. Chau & Associates, LLC

(57) ABSTRACT

A method of verifying programming of an integrated circuit card includes transferring program data to a page buffer of a non-volatile memory, copying the program data to a buffer memory, calculating a first checksum value with respect to program data in the buffer memory, updating the program data in the buffer memory by copying the program data of the page buffer to the buffer memory, calculating a second checksum value with respect to updated program data in the buffer memory, comparing the first checksum value and the second checksum value, and determining, based on the comparison result, whether the program data of the page buffer is tampered.

29 Claims, 6 Drawing Sheets

U.S. PATENT DOCUMENTS

| | | | |
|---|---|---|---|
| 7,733,697 B2 * | 6/2010 | Picca et al. | 365/185.09 |
| 2004/0202034 A1 * | 10/2004 | Lee | 365/202 |
| 2004/0230879 A1 | 11/2004 | Crosby | |
| 2005/0060540 A1 * | 3/2005 | Okaue et al. | 713/160 |
| 2006/0235909 A1 * | 10/2006 | Oks et al. | 707/204 |
| 2007/0170268 A1 * | 7/2007 | Lee | 235/492 |
| 2007/0176957 A1 * | 8/2007 | Ahne et al. | 347/19 |
| 2008/0019176 A1 * | 1/2008 | Fujisawa et al. | 365/185.03 |
| 2008/0040598 A1 * | 2/2008 | Lee et al. | 713/2 |
| 2008/0086631 A1 * | 4/2008 | Chow et al. | 713/2 |
| 2010/0115376 A1 * | 5/2010 | Shalvi et al. | 714/763 |

FOREIGN PATENT DOCUMENTS

| | | |
|---|---|---|
| JP | 2003337759 | 11/2003 |
| JP | 2004171747 | 6/2004 |
| KR | 20000060928 | 10/2000 |
| KR | 20040002143 | 1/2004 |

OTHER PUBLICATIONS

English Abstract for Publication No. 2003-085511.
English Abstract for Publication No. 2003-337759.
English Abstract for Publication No.: 1020040002143.
English Abstract for Publication No. 2004-171747.

* cited by examiner

[0] NVM Programming check on/off control bit
  0 : NVM checking off(Reset)
  1 : NVM checking on

[1] Error correction/detection selection bit
  0 : Detection(Reset)
  1 : Correction

[2] Attack detection flag bit
  0 : Not attaeked
  1 : Attaeked

[3-4]Notused

[5] FIQ Generation control bit
  0 : Disable FIQ
  1 : Enable FIQ

[5] Error detection flag(Read-only)
  0 : Notdetected
  1 : Detected

[7] : Notused

US 7,992,009 B2

DEVICE AND METHOD CAPABLE OF VERIFYING PROGRAM OPERATION OF NON-VOLATILE MEMORY AND METHOD CARD INCLUDING THE SAME

CROSS-REFERENCE TO RELATED APPLICATIONS

This U.S. non-provisional patent application claims priority under 35 U.S.C §119 of Korean Patent Application 2006-2290 filed on Jan. 9, 2006, the entire contents of which are hereby incorporated by reference.

BACKGROUND OF THE INVENTION

1. Technical Field

The present invention relates to an electronic device and, more particularly, an integrated circuit device capable of verifying a program operation of a non-volatile memory.

2. Discussion of Related Art

A smart card is a card embedded with a microprocessor and a memory or with a memory chip without logic. The microprocessor can add, delete, and process information on the card, while the memory chip (e.g., a pre-paid card) can perform only given operations. Unlike a magnetic strip card, the smart card can store functions and information. Therefore, the smart card can access a remote database during processing. Smart cards may be categorized into three types, including an integrated circuit microprocessor card, an integrated circuit memory card, and an optical memory card.

Data (e.g., financial information) stored in the smart card needs high security. For this reason, in a case of programming data needing secure data storage, data written to the smart card needs to be verified. Herein, a program operation may include a write operation, erase and write operations, and an erase operation.

Verification of programmed data stored on the smart card may be carried out through the following stages. Source data is stored in a target region of secure data storage. Stored data is read out from the target region of the secure data storage, and the read data is compared with the source data. The data is verified according to the comparison result. In the comparison, data read from the target region of the secure data storage is compared with the source data in a given unit (e.g., a word unit). The comparison may need a long time to perform the compare operation, which may act as a limit factor to improve an operation performance of the smart card.

SUMMARY OF THE INVENTION

Exemplary embodiments of the present invention are directed to a method of verifying programming of an integrated circuit card which comprises transferring program data to a page buffer of a non-volatile memory, copying the program data to a buffer memory, calculating a first checksum value with respect to program data in the buffer memory, updating the program data in the buffer memory by copying the program data of the page buffer to the buffer memory, calculating a second checksum value with respect to updated program data in the buffer memory, comparing the first checksum value and the second checksum value, and determining, based on the comparison result, whether the program data of the page buffer is tampered.

Other exemplary embodiments of the present invention are directed to an integrated circuit card which comprises a RAM, a non-volatile memory, and a control unit for controlling the RAM and the non-volatile memory, wherein at a program operation, after transferring program data in the RAM to a page buffer of the non-volatile memory, the control unit determines whether the program data of the page buffer is tampered and enables the program data of the page buffer to be stored in a selected page of the non-volatile memory according to the determination.

BRIEF DESCRIPTION OF THE DRAWINGS

Non-limiting and non-exhaustive embodiments of the present invention will be described with reference to the following figures, wherein like reference numerals refer to like parts throughout the various figures unless otherwise specified. In the figures.

DETAILED DESCRIPTION OF PREFERRED EMBODIMENTS

Figure 1:
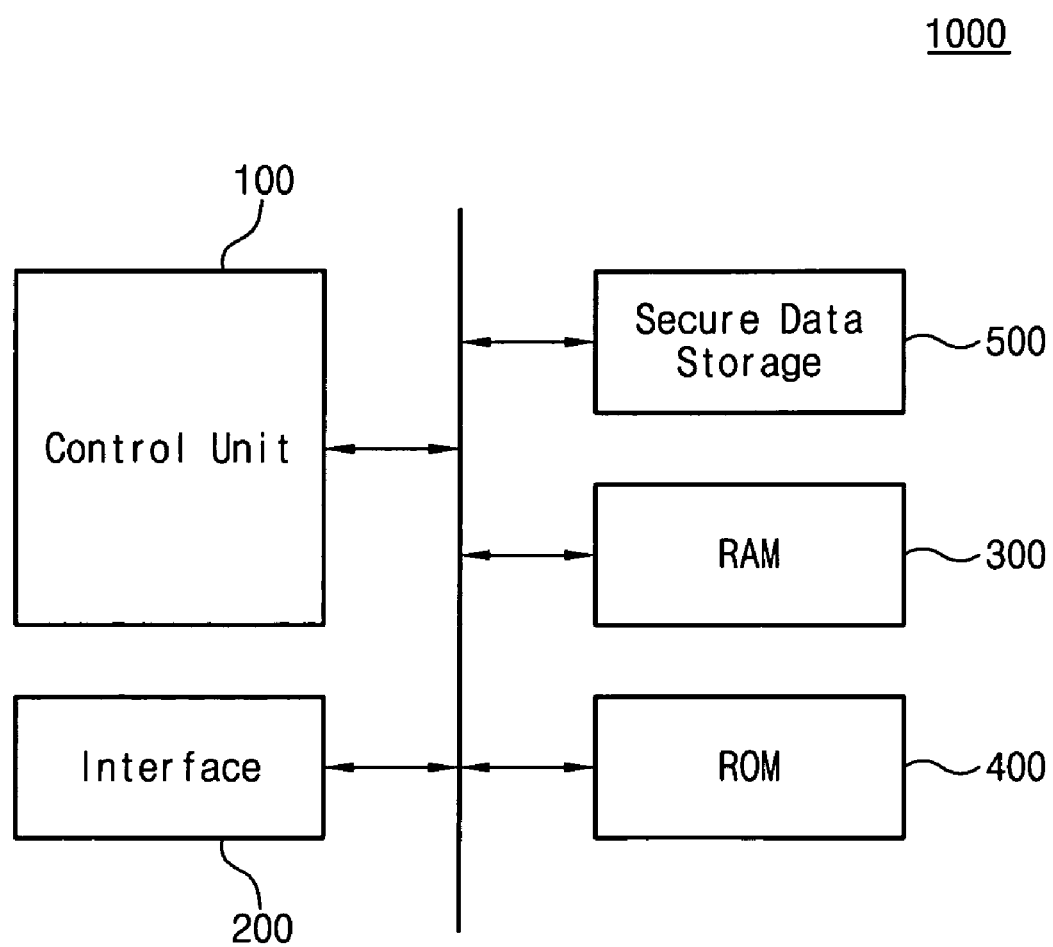
FIG. 1 is a block diagram showing an integrated circuit device according to an embodiment of the present invention.

The present invention will now be described more fully hereinafter with reference to the accompanying drawings, in which preferred embodiments of the invention are shown. This invention, however, may be embodied in many different forms and should not be construed as limited to embodiments set forth herein. Rather, embodiments are provided so that this disclosure will be thorough and complete. In the drawings, like numbers refer to like elements throughout.

FIG. 1 is a block diagram showing an integrated circuit device according to an embodiment of the present invention. The integrated circuit device 1000 is, for example, a smart card. However, it would be obvious to one skilled in the art that the integrated circuit device 1000 is not limited to smart cards.

Referring to FIG. 1, the integrated circuit device 1000, referred to hereinafter as the smart card 1000, includes a control unit 100, an interface block 200, random access memory (RAM) 300, read-only memory (ROM) 400, and secure data storage 500. The secure data storage 500 may include a non-volatile memory such as electrically erasable programmable read-only memory (EEPROM), a flash memory, and the like.

The control unit 100 is configured to control an overall operation of the smart card 1000. In particular, the control unit 100 is configured to detect tampering of program data via an external attack without intervention of software (the control unit 100 may operate under software supervision) and to perform a program verification operation. The interface block 200 interfaces with an external device such as a card reader. The interface block 200 may provide various interface functions. For example, the interface block 200 may communicate with an external device via electric connections and/or wireless connections. Methods for communicating with the interface block 200 are well known to those skilled in the art, and a description thereof is thus omitted. The RAM 300 operates as a working memory and may be used to temporarily store data to be stored in the secure data storage 500 or data read out from the secure data storage 500. The RAM 300 may be used to temporarily store data processed by the control unit 100. The ROM 400 stores various programs that are used by the control unit 100 and needed to operate the smart card 1000. The secure data storage 500 may be used to store data needing the security based on the control of the control unit 100.

The smart card 1000 according to an embodiment of the present invention may be configured to verify whether data to be stored is valid data before programming of data to the secure data storage 500 and to verify whether stored data is valid data after storing of data in the secure data storage 500. With this verification scheme, it is possible to substantially prevent tampered data from being programmed. It is possible to verify whether stored data is valid data, automatically without intervention of software.

Figure 2:
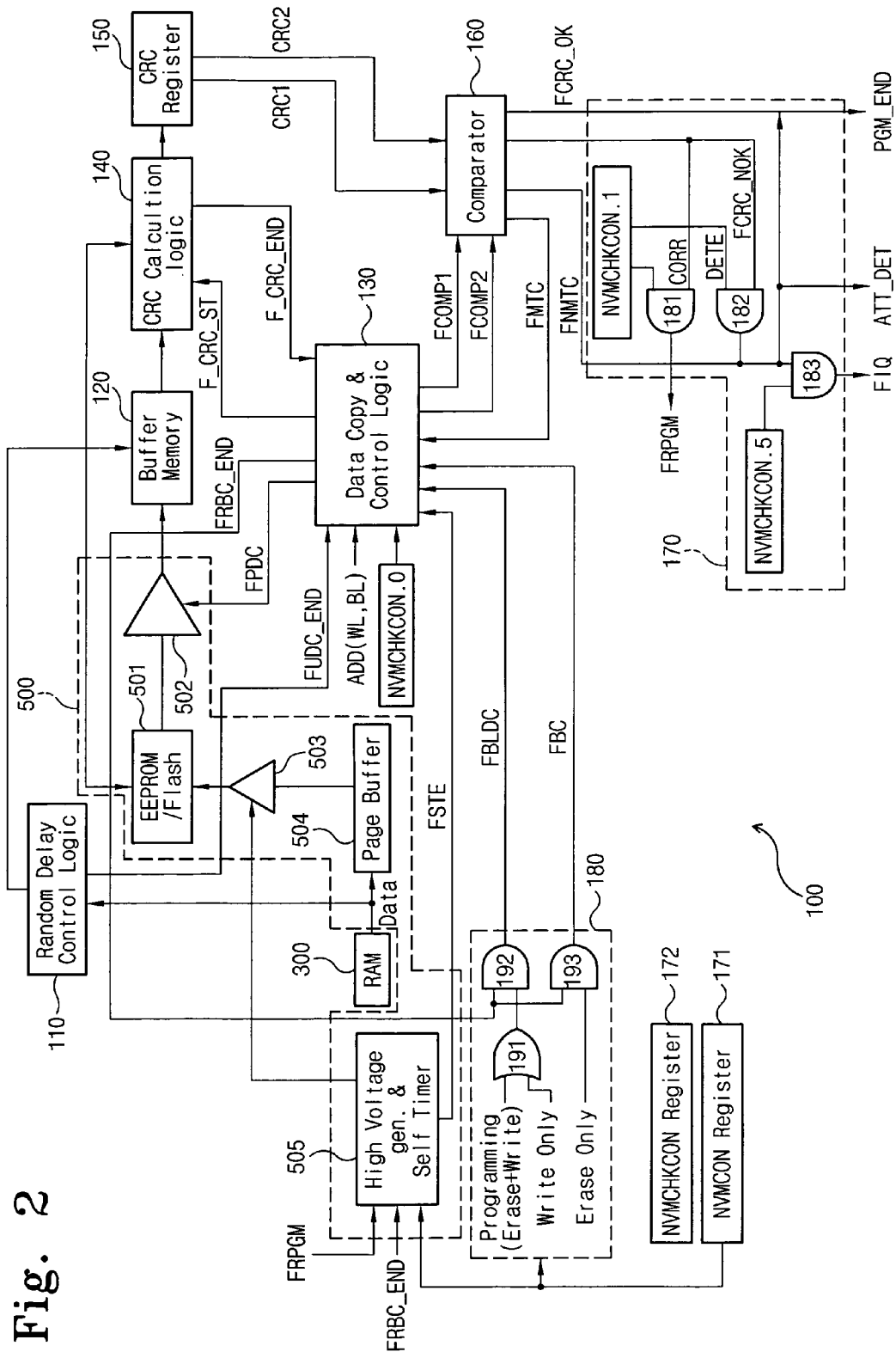
FIG. 2 is a block diagram showing a control unit in FIG. 1 according to some embodiments of the present invention.

FIG. 2 is a block diagram showing the control unit 100 illustrated in FIG. 1 according to some embodiments of the present invention. Referring to FIG. 2, the control unit 100 comprises random delay control logic 110, a buffer memory 120, data copy and control logic 130, cyclic redundancy check (CRC) calculation logic 140, a CRC register 150, a comparator 160, registers 171 and 172, correction/detection control logic 170, and a signal generator 180.

The random delay control logic 110 is configured to copy program data stored in RAM 300 to the buffer memory 120 after the program data is transferred to a page buffer 504 of secure data storage 500 from the RAM 300. The random delay control logic 110 generates a flag signal FUDC_END when the program data stored in the RAM 300 is completely copied to the buffer memory 120. Activation of the flag signal FUDC_END indicates that program data is completely copied to the buffer memory 120 from the RAM 300.

The CRC calculation logic 140 is configured to perform a CRC calculation operation with respect to stored data in the buffer memory 120 in, response to a control signal F_CRC_ST from the data copy and control logic 130. The CRC calculation logic 140 is configured to read data directly from an array 501 of the secure data storage 500 and to perform a CRC calculation operation with respect to the read data, based on a control signal F_CRC_ST from the data copy and control logic 130. Resultant values, each resultant value corresponds to a 2-byte checksum value, calculated by the CRC calculation logic 140 are stored in the CRC register 150. Also stored are two 2-byte checksum values that are obtained through two CRC calculation operations. The CRC calculation logic 140 generates a flag signal FCRC_END whenever the CRC calculation operation is completed.

The comparator 160 operates responsive to a control signal FCOMP1 from the data copy and control logic 130 and compares data in the page buffer 504 of the secure data storage 500 with data in the buffer memory 120. The comparator 160 activates one of flag signals FMTC and FNMTC as a comparison result. Activation of the flag signal FMTC indicates that data in the page buffer 504 is identical to data in the buffer memory 120, and activation of the flag signal FNMTC indicates that data in the page buffer 504 coincides with data in the buffer memory 120. When data loaded on the page buffer 504 is determined to have been tampered, the flag signal FNMTC is activated and a program operation is suspended. The comparator 160 compares resultant values CRC1 and CRC2 stored in the CRC register 150, and generates flag signals FCRC_OK and FCRC_NOK as a comparison result. The flag signal FCRC_NOK is activated when the resultant values CRC1 and CRC2 in the CRC register 150 are not identical to each other, and the flag signal FCRC_OK is activated when the resultant values CRC1 and CRC2 in the CRC register 150 are identical to each other.

Figure 3:
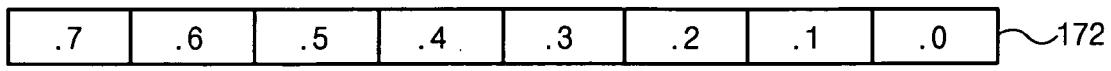
FIG. 3 is a diagram for describing setting information of a register 172 illustrated in FIG. 2.

The register 171 stores control information of the secure data storage 500. For example, the register 171 stores high-voltage activation information, self-timer activation information, command information, etc. The register 172 stores verification information with respect to a write operation of the secure data storage 500, and is a 8-bit register as illustrated in FIG. 3. [0] bit is a programming verify on/off control bit of the secure data storage 500. For example, when having logic '1', the [0] bit indicates that a verify function is in an on state. When having logic '0', the [0] bit indicates that a verify function is in an off state. The [0] bit may be set to logic '0' as its initial value. [1] bit indicates error correction/detection select information. For example, the [1] bit of logic '0' indicates that an error detection function is selected, and the [1] bit of logic '0' indicates that an error correction function is selected. [2] bit is an external attack detection flag bit. The [2] bit of logic '0' indicates that program data is not tampered by an external attack, and the [2] bit of logic '1' indicates that program data has been tampered by an external attack. [5] bit is an interrupt generation control bit. When set to logic '0', the [5] bit is indicative of an off state of an interrupt generation function. When set to logic '1', the [5] bit is indicative of an on state of the interrupt generation function. [6] bit is an error detection flag bit and is set by a microprocessor or CPU (not shown) of the control unit 100. The [6] bit of logic '0' indicates that no error is detected, and the [6] bit of logic '1' indicates that an error is detected. The [5] bit is used as valid information only when the [1] bit is set to logic '0'. That is, in a case where the [1] bit is set to logic '0', an interrupt is generated when the [5] bit is set to logic '1'. In a case where the [1] bit is set to logic '1', no interrupt is generated although an error is detected. In a case where an error detection function is selected (or the [1] bit is set to logic '0'), the [6] bit is set when an error is generated, and is cleared by an activated high-voltage activation signal. The remaining [3], [4] and [7] bits are reserved bits.

Continuously, the correction/detection control logic 170 generates a program end signal PGM_END, an external attack detection signal ATT_DET, a re-program signal FRPGM, and an interrupt signal FIQ in response to information stored in the register 172 and flag signals FNMTC, FCRC_NOK, and FCRC_OK. For example, in a case where the flag signal FNMTC is activated, the correction/detection control logic 170 activates the signals PGM_END and ATT_DET. And, the control logic 170 generates the interrupt signal FIQ based on whether the [5] bit of the register 172 is set. The control logic 170 activates the program end signal PGM_END when the flag signal FCRC_OK is activated, ending a program procedure. In the case that the flag signal FCRC_NOK is activated, the correction/detection control logic 170 activates one of the signals FRPGM, PGM_END, and FIQ based on whether the [1] bit of the register 172 is set.

The signal generator 180 activates one of flag signals FBLDC and FBC in response to command information stored in the register 171 and a control signal FRBC_END from the data copy and control logic 130. For example, in a case where a command indicative of erase and write operations or a write operation is set to the register 171, the signal generator 180 generates the flag signal FBLDC in response to activation of the control signal FRBC_END. When a command indicative of an erase operation is set to the register 171, the signal generator 180 generates the flag signal FBC in response to activation of the control signal FRBC_END.

Figure 4:
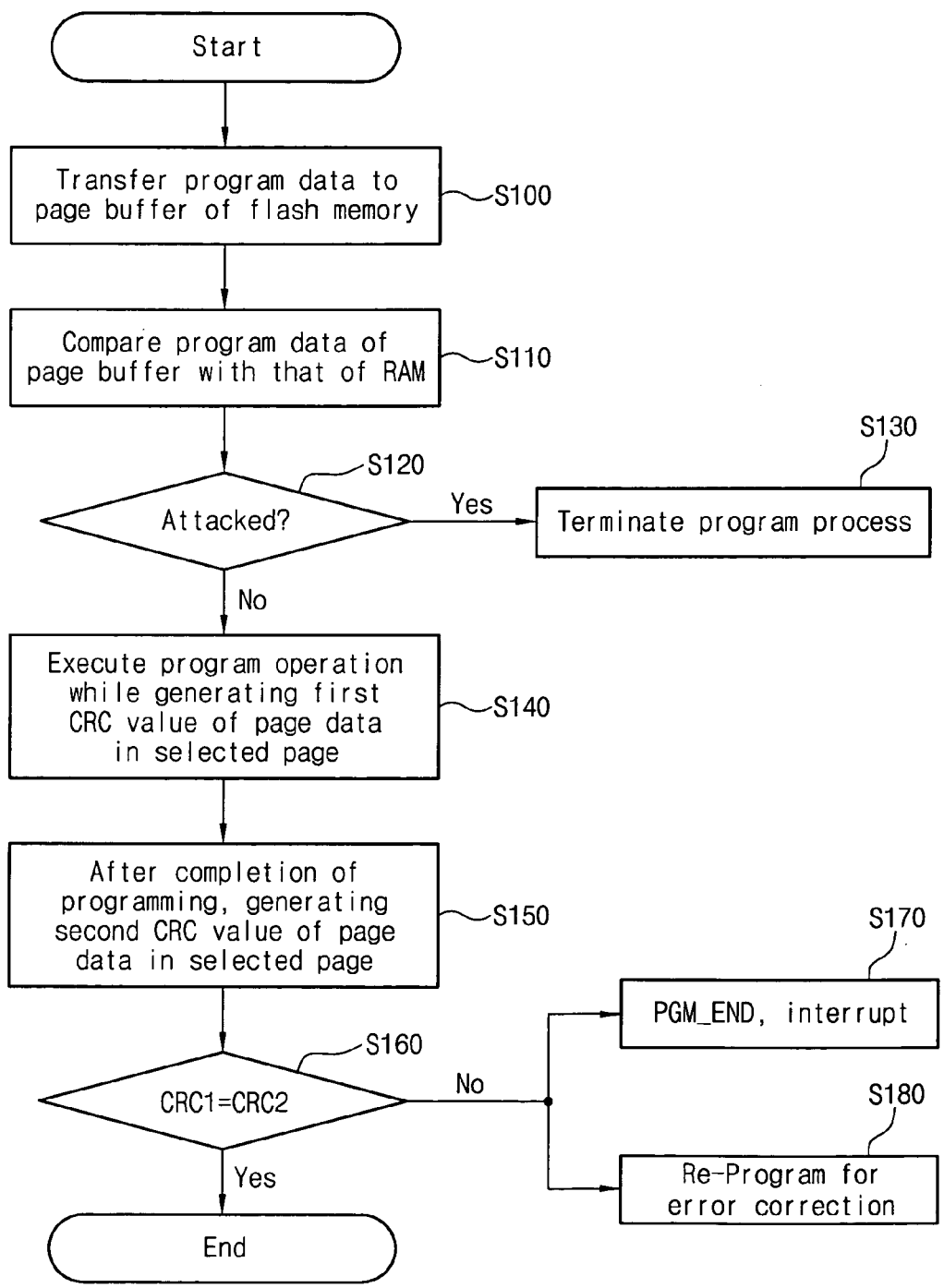
FIG. 4 is a flowchart for describing a verify operation of a smart card according to an embodiment of the present invention.
Figure 5A:
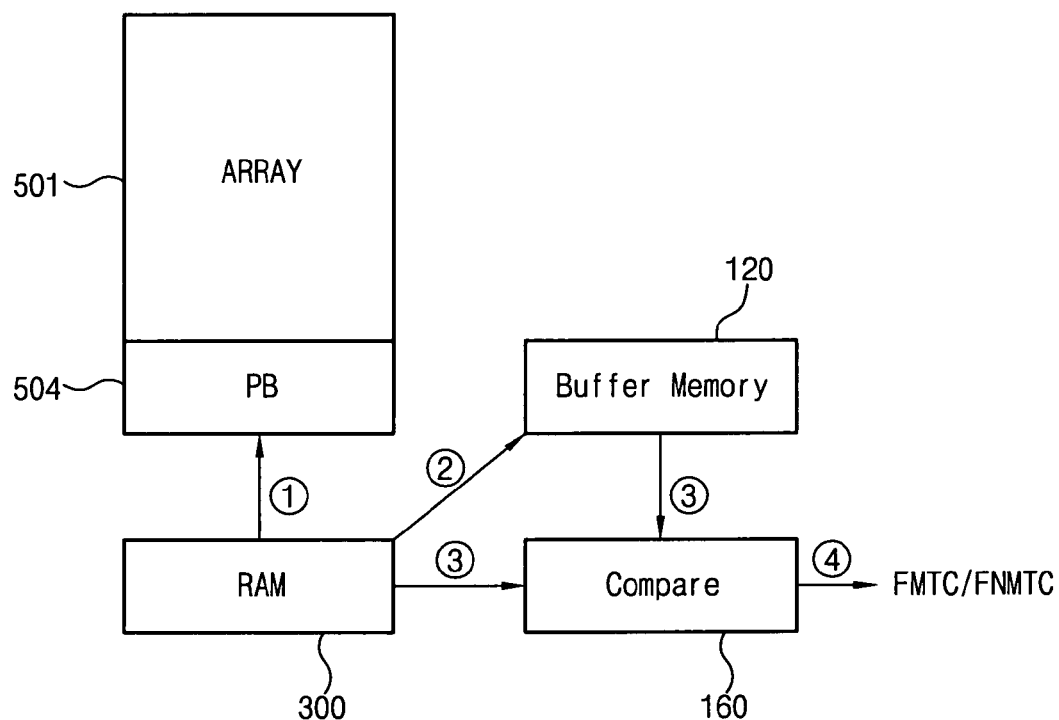
FIGS. 5A and 5B are diagrams showing a control flow according to a verify operation of a smart card.
Figure 5B:
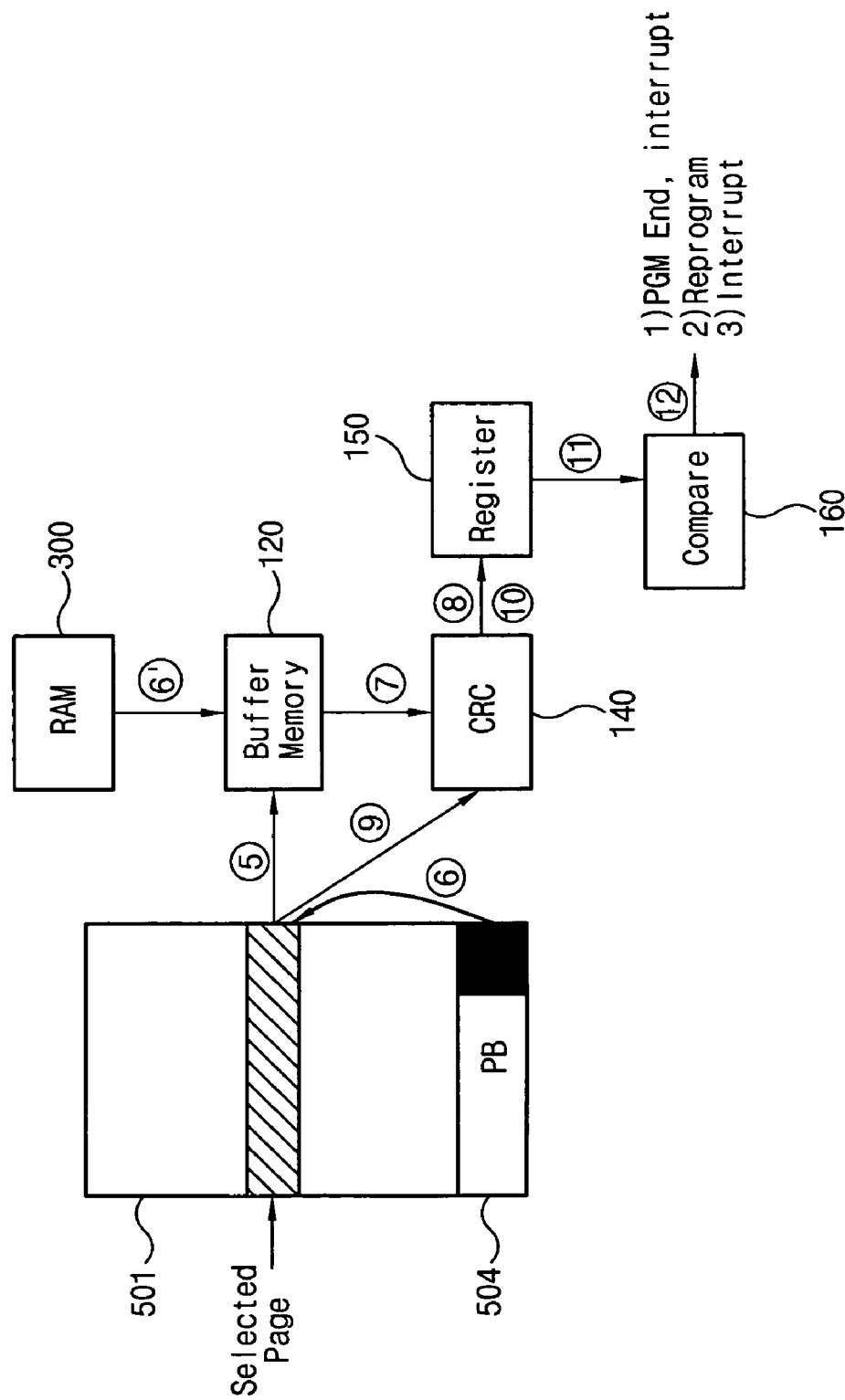

FIG. 4 is a flowchart for describing a verification operation of a smart card according to an embodiment of the present invention, and FIGS. 5A and 5B show control flows according to a verification operation of a smart card. A verification operation of a smart card according to an embodiment of the present invention will be more fully described with reference to accompanying drawings.

As an external device requests a program operation, data from the external device is stored in RAM 300 of the smart card 1000, and a register may be set by a microprocessor or CPU of control logic 100, for example, according to the setting method described with reference to FIG. 3. In block S100, data stored in the RAM 300 is transferred to a page buffer 504 of a secure data storage 500 via path ① in FIG. 5A. Once the transfer of data into the page buffer 504 is complete, loaded data on the page buffer 504 is verified.

Once the transferring of data into the page buffer 504 is complete, the random delay control logic 110 transfers data from the RAM 300 to a buffer memory 120 (refer to path ② in FIG. 5A). If all data is transferred to the buffer memory 120, the random delay control logic 110 generates a flag signal FUDC_END. Data copy and control logic 130 generates a control signal FCOMP1 in response to the flag signal FUDC_END. A comparator 160 receives data of the buffer memory 120 and data of the RAM 300 and compares the received data (S110, refer to path ③ in FIG. 5A). The comparator 160 activates one of flag signals FMTC and FNMTC as a comparison result (refer to path ④ in FIG. 5A).

In a case where the flag signal FNMTC is activated, in step 120, correction/detection control logic 170 judges whether data in the page buffer 504 is tampered by the external attack. The correction/detection control logic 170 activates a program end signal PGM_END and an external attack detect signal ATT_DET in response to the activation of the flag signal FNMTC. This indicates that the data in the page buffer 504 is tampered by the external attack, and a program procedure may be ended according to the following stages (S130). As the program end signal PGM_END is activated, the page buffer 504 is reset/initialized, a high-voltage activation bit of a register 171 is reset, and an external attack detect flag signal of the register 171 informing that an external attack is detected is set. And, the correction/detection control logic 170 activates an interrupt signal FIQ based on whether [5] bit of a register 172 is set to logic '1'. In a case where the [5] bit is set to logic '0' indicative of an off state of an interrupt generation function, the interrupt signal FIQ is not activated. In a case where the [5] bit is set to logic '1' indicative of an on state of an interrupt generation function, the interrupt signal FIQ is activated.

In a case where a flag signal FMTC is activated, which indicates that data loaded on the page buffer 504 is valid data, in block S140 a program operation is executed, and simultaneously a CRC calculation may be performed with respect to data of a selected page under the control of the data copy and control logic 130. This determines whether the loaded data on the page buffer 504 is normally programmed.

When the flag signal FMTC is activated, the data copy and control logic 130 copies data of a selected page to the buffer memory 120 based on whether [0] bit of the register 172 is set to logic '1' (refer to path ⑤ in FIG. 5B). This is accomplished by transferring data of the selected page to the buffer memory 120 via a read circuit 502 by means of row address information ADD(WL). At this time, data transferred to the buffer memory 120 is page data before programming.

If the transferring of data to the buffer memory 120 is completed, the data copy and control logic 130 activates a control signal FRBC_END. A high-voltage generation and self timer block 505 supplies a high voltage to a write circuit 503 based on the activation of the control signal FRBC_END. This enables the loaded data on the page buffer 502 to be programmed at cells of the selected page (refer to path ⑥ in FIG. 5B). A self timer of the block 505 counts a program time from a time when the high voltage is supplied. At the same time, at the activation of the control signal FRBC_END, a signal generator 180 activates one of flag signals FBLDC and FBC according to an operation mode. For example, when a command in a register 171 indicates a write operation, the signal generator 180 activates the flag signal FBLDC in response to the activation of the control signal FRBC_END. When a command in the register 171 indicates an erase operation, the signal generator 180 activates the flag signal FBC. The data copy and control logic 130 updates the buffer memory 120 with data (i.e., program data) stored in the RAM 300 in response to the activation of the flag signal FBLDC. This is accomplished by copying program data to a region of the buffer-memory 120, a target region where program data is to be stored, according to column address information ADD (BL) related to the program data (refer to path ⑥' in FIG. 5B). In the case that an update operation is performed when the flag signal FBC is activated, a region of the buffer memory 120 may be updated with "0xFF" as erase data in the same manner as described above.

Once the update operation is completed, the CRC calculation logic 140 is initialized by a flag signal indicating that the update operation is completed. The data copy and control logic 130 activates a control signal F_CRC_ST in response to the flag signal. The CRC calculation logic 140 performs a CRC calculation-operation with respect to data stored in the buffer memory 120 in response to the control signal F_CRC_ST (refer to path ⑦ in FIG. 5B). At this time, the CRC calculation logic 140 may performs the CRC calculation operation while automatically increasing a data offset value at an CRC calculation operation of the buffer memory 120. If the CRC calculation operation is completed, a 2-byte calculation result is stored in a CRC register 150 (refer to path ⑧ in FIG. 5B). The CRC calculation operation may be performed during a period where the program operation is carried out.

After the program operation is completed, in block S150 a CRC calculation operation may be carried out with respect to data of the selected page.

After completing a CRC calculation operation with respect to data stored in the buffer memory 120, a flag signal FSTE indicative of an end of a program time may be sent to the data copy and control logic 130 from the high-voltage generation and self-timer block 505. The data copy and control logic 130 generates the control signal F_CRC_ST in response to the flag signal FSTE, and the CRC calculation logic 140 is reset by the control signal F_CRC_ST. After reset, the CRC calculation logic 140 directly fetches data from a selected page of the secure data storage 500 using row address information and performs a CRC calculation operation with respect to the fetched data (refer to path ⑨ in FIG. 5B). If the CFC calculation operation is completed, a 2-type calculation result may be stored in the CRC register 150 (refer to path ⑩ in FIG. 5B).

Once the CRC calculation operation is completed, the CRC calculation logic 140 generates a flag signal F_CRC_END. The data copy and control logic 130 generates a control signal FCOMP2 in response to the flag signal F_CRC_END. The comparator 160 determines whether CRC values CRC1 and CRC2 stored in the CRC register 150 are identical to each other, based on the control signal FCOMP2. Herein, the CRC value CRC1 indicates a resultant value of a CRC calculation operation performed after copying data of a selected page to the buffer memory 120 before a program operation and updating the buffer memory 120 with program data of the RAM 300. The CRC value CRC2 indicates a resultant value of a CRC calculation operation with respect to data of a selected page after a program operation. If the CRC values CRC1 and CRC2 are identical to each other, the comparator 160 generates the flag signal FCRC_OK. The correction/detection control logic 170 generates a program end signal PGM_END in response to the flag signal FCRC_OK, so that a program operation is ended. At this time, the page buffer 504 and the high-voltage activation bit of the register 171 are cleared. This means that a program operation is normally performed without tampering of data by an external attack.

If the CRC values CRC1 and CRC2 in the CRC register 150 are not identical to each other, the comparator 160 generates a flag signal FCRC_NOK. Generation of the flag signal FCRC_NOK indicates that data is not written normally in memory cells due to any cause such as deterioration of a circuit for generating a high voltage, deterioration of memory cells, and etc. In this case, a program operation may be ended or re-performed. For example, when the flag signal FCRC_NOK is generated, based on whether [1] bit of the register 172 is set to logic '1', a re-program operation may be performed or a program operation may be ended. In particular, in a case where the [1] bit of the register 172 is set to logic '0' indicative of selection of an error detection function, an output of the AND gate 182 may be activated. This activates the program end signal PGM_END, so that the program operation is ended (S170). A procedure of ending the program operation is performed in the same manner as described above. At the same time, [6] bit of the register 172 is set to logic '1' indicating that program error has occurred. The interrupt signal FIQ may be generated via the AND gate 183 only when [5] bit of the register 172 is set to logic '1'.

In a case where the [1] bit of the register 172 is set to logic '1' indicating selection of an error correction function, an output of the AND gate 181, that is, a re-program signal FRPGM may be activated. As the re-program signal FRPGM is activated, a program operation may be carried out again (S180). The procedure goes to block S140 to perform a re-program operation. In this case, copying data of a selected page to the buffer memory 120, updating the buffer memory 120 with program data, and performing a CRC calculation operation with respect to data in the buffer memory 120 are skipped. This is because the CRC value CRC1 generated at a previous program operation is stored in the CRC register 150. Afterwards, a program procedure is performed the same as described above.

As described above, before data is programmed in the secure data storage, the data to be stored is verified as valid data. After data is stored in the secure data storage, the stored data is verified as valid data. It is possible to substantially prevent programming of data tampered by the external attack and to verify, automatically without intervention of software, whether stored data is valid data.

Although the present invention has been described in connection with embodiments of the present invention illustrated in the accompanying drawings it is not limited thereto. It will be apparent to those skilled in the art that various substitution, modifications and changes may be thereto without departing from the scope and spirit of the invention.

What is claimed is:

1. A method of verifying programming of an integrated circuit card comprising:
   transferring data to be stored to a page buffer of a non-volatile memory;
   copying the data to a buffer memory;
   calculating a first checksum value with respect to the data in the buffer memory;
   updating the data in the buffer memory by copying the data of the page buffer to the buffer memory;
   calculating a second checksum value with respect to updated data in the buffer memory;
   comparing the first checksum value and the second checksum value; and
   determining, based on the comparison result, whether the data of the page buffer is tampered.

2. The method of claim 1, wherein a random access memory of the integrated circuit card is provided with the data which is copied to the buffer memory after the transferring of data to the page buffer of the non-volatile memory is completed.

3. The method of claim 1, further comprising:
   terminating a program procedure when the first checksum value and the second checksum value do not coincide with each other.

4. The method of claim 3, further comprising:
   generating an interrupt when the first checksum value and the second checksum value do not coincide with each other.

5. The method of claim 3, further comprising:
   generating external attack detection information when the first checksum value and the second checksum value do not coincide with each other.

6. The method of claim 1, further comprising:
   copying page data from a selected page of the non-volatile memory to the buffer memory, when the first checksum value and the second checksum value coincide with each other, the data being to be stored in the selected page; and
   programming the data of the buffer memory to the selected page.

7. The method of claim 6, further comprising:
   updating the buffer memory with data stored in the random access memory of the integrated circuit chip while the data of the buffer memory is programmed in the selected page; and
   calculating a third checksum value with respect to data of the buffer memory.

8. The method of claim 7, further comprising:
   calculating a fourth checksum value with respect to data of the selected page directly via a cyclic redundancy check calculation logic after a operation for the data is completed; and
   determining a pass/fail of the program operation based on whether the third checksum value corresponds to the fourth checksum value.

9. The method of claim 8, further comprising:
   terminating a program procedure when the third checksum value corresponds to the fourth checksum value.

10. The method of claim 8, further comprising:
    performing a re-program operation when the third checksum value does not correspond to the fourth checksum value.

11. The method of claim 10, wherein at the re-program operation, no calculation operation for the third checksum value is performed.

12. The method of claim 8, further comprising:
    setting a flag bit informing a generation of a program error and terminating the program operation when no third checksum value corresponds to the fourth checksum value.

13. An integrated circuit card comprising:
    a random access memory;
    a non-volatile memory; and a control unit for controlling the random access memory and the non-volatile memory, wherein the control unit comprises:

a buffer memory;

a cyclic redundancy check logic;

a random delay control logic for copying the data of the random access memory to the buffer memory after the data is transferred to the page buffer; and a data copy and control logic for controlling the cyclic redundancy check calculation logic so as to calculate a first checksum value with respect to the data of the buffer memory, after the data is copied to the buffer memory from the random access memory, wherein at a program operation, after transferring program data to be stored in the RAM to a page buffer of the non-volatile memory, the control unit determines whether the data of the page buffer is tampered and enables the data of the page buffer to be stored in a selected page of the non-volatile memory according to the determination.

14. The method of claim 13, wherein after the first checksum value is calculated, the data copy and control logic controls the non-volatile memory so that the data of the page buffer is transferred to the buffer memory.

15. The integrated circuit chip of claim 14, wherein after the data of the page buffer is transferred to the buffer memory, the data copy and control logic controls the cyclic redundancy check calculation logic so as to calculate a second checksum value with respect to the data of the buffer memory from the page buffer.

16. The integrated circuit card of claim 15, wherein the control unit further comprises:

a cyclic redundancy check register for storing the first checksum value and the second checksum value;

a comparator controlled by the data copy and control logic, for determining whether the first checksum value is identical to the second checksum value; and a correction/detection control logic for generating a program end signal when the comparison result indicates that the first checksum value is not identical to the second checksum value.

17. The integrated circuit card of claim 16, wherein when the program end signal is generated, the correction/detection control logic generates an external attack detection flag signal informing that the data of the page buffer is tampered.

18. The integrated circuit card of claim 16, wherein the program end signal is generated, the correction/detection control logic generates an interrupt.

19. The integrated circuit card of claim 16, wherein when the comparison result indicates that the first checksum value is identical to the second checksum value, the data copy and control logic controls the non-volatile memory so that data of a selected page in the non-volatile memory is copied to the buffer memory.

20. The integrated circuit card of claim 19, wherein after data of a selected page in the non-volatile memory is copied to the buffer memory, the data copy and control logic controls the non-volatile memory so that the data of the page buffer is programmed in the selected page.

21. The integrated circuit card of claim 20, wherein while a program operation is carried out, the data copy and control logic updates the buffer memory with the data of the random access memory.

22. The integrated circuit card of claim 21, wherein the data copy and control logic controls the cyclic redundancy check calculation logic so as to calculate a third checksum value with respect to data of the buffer memory, the third checksum value being stored in the register.

23. The integrated circuit card of claim 22, wherein when the program operation is completed, the data copy and control logic controls the non-volatile memory so that data of the selected page is copied to the buffer memory, and then controls the cyclic redundancy check calculation logic so as to calculate a fourth checksum value with respect to data of the buffer memory, the fourth checksum value being stored in the register.

24. The integrated circuit card of claim 23, wherein the data copy and control logic controls the comparator to judge whether the third checksum value is identical to the fourth checksum value.

25. The integrated circuit card of claim 24, wherein when the third checksum value is identical to the fourth checksum value, the correction/detection control logic generates a program end signal.

26. The integrated circuit card of claim 24, wherein when the third checksum value is not identical to the fourth checksum value, the correction/detection control logic generates a re-program signal so that data of the page buffer is re-programmed.

27. The integrated circuit card of claim 26, wherein at the re-program operation, a calculation operation for the third checksum value is not carried out.

28. The integrated circuit card of claim 24, wherein when the third checksum value is not identical to the fourth checksum value, the correction/detection control logic generates a flag signal informing a program error generation and a program end signal informing an end of the program operation.

29. The integrated circuit card of claim 14, wherein the integrated circuit card comprises a smart card.

* * * * *